(12) United States Patent
Miyake

(10) Patent No.: US 6,900,912 B1
(45) Date of Patent: May 31, 2005

(54) IMAGE FILE MANAGING METHOD, ELECTRONIC CAMERA AND IMAGE FILING APPARATUS

(75) Inventor: Izumi Miyake, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 611 days.

(21) Appl. No.: 09/707,945

(22) Filed: Nov. 8, 2000

(30) Foreign Application Priority Data

Nov. 12, 1999 (JP) .......................................... 11-322275

(51) Int. Cl.$^7$ ................................................ H04N 1/04
(52) U.S. Cl. ................................. 358/474; 348/231.2
(58) Field of Search ............................... 358/474, 400, 358/402, 206, 201; 348/231.2, 231.3, 231.6; 709/206, 201

(56) References Cited

U.S. PATENT DOCUMENTS

| | | | | |
|---|---|---|---|---|
| 5,138,459 A | * | 8/1992 | Roberts et al. | 348/231.6 |
| 5,239,382 A | * | 8/1993 | Hatakenaka et al. | 386/117 |
| 5,349,448 A | * | 9/1994 | Hirai | 358/444 |
| 5,454,096 A | * | 9/1995 | Otsuka et al. | 711/1 |
| 6,169,575 B1 | * | 1/2001 | Andreson | 348/231 |
| 6,230,187 B1 | * | 5/2001 | Suzuki | 709/209 |
| 6,654,051 B1 | * | 11/2003 | Fujita et al. | 348/231.1 |

FOREIGN PATENT DOCUMENTS

| | | | | |
|---|---|---|---|---|
| EP | 0982667 | * | 3/2000 | |
| JP | 10190993 | | 12/1996 | H04N/1/21 |
| JP | 101909993 | * | 7/1998 | H04N/1/32 |

* cited by examiner

*Primary Examiner*—Kimberly Williams
*Assistant Examiner*—Negussie Worku
(74) *Attorney, Agent, or Firm*—Birch, Stewart, Kolasch & Birch, LLP

(57) ABSTRACT

To provide an image folder for depositing image files which is automatically created for each recording medium so that image files recorded on each recording medium can be managed separately. By using a memory card having unique identification information recorded in a rewrite impossible area, the identification information is acquired from the above described memory card and presence or absence of an image folder having a directory name (image folder name) corresponding to the identification information is discriminated at the time of depositing image files recorded on the memory card in an image filing apparatus. The above described image files are deposited in the above described image folder when the above described image folder is present or an image folder having the image folder name corresponding to the above described identification information is created and the above described image files are deposited in the created image folder.

6 Claims, 7 Drawing Sheets

F I G. 1
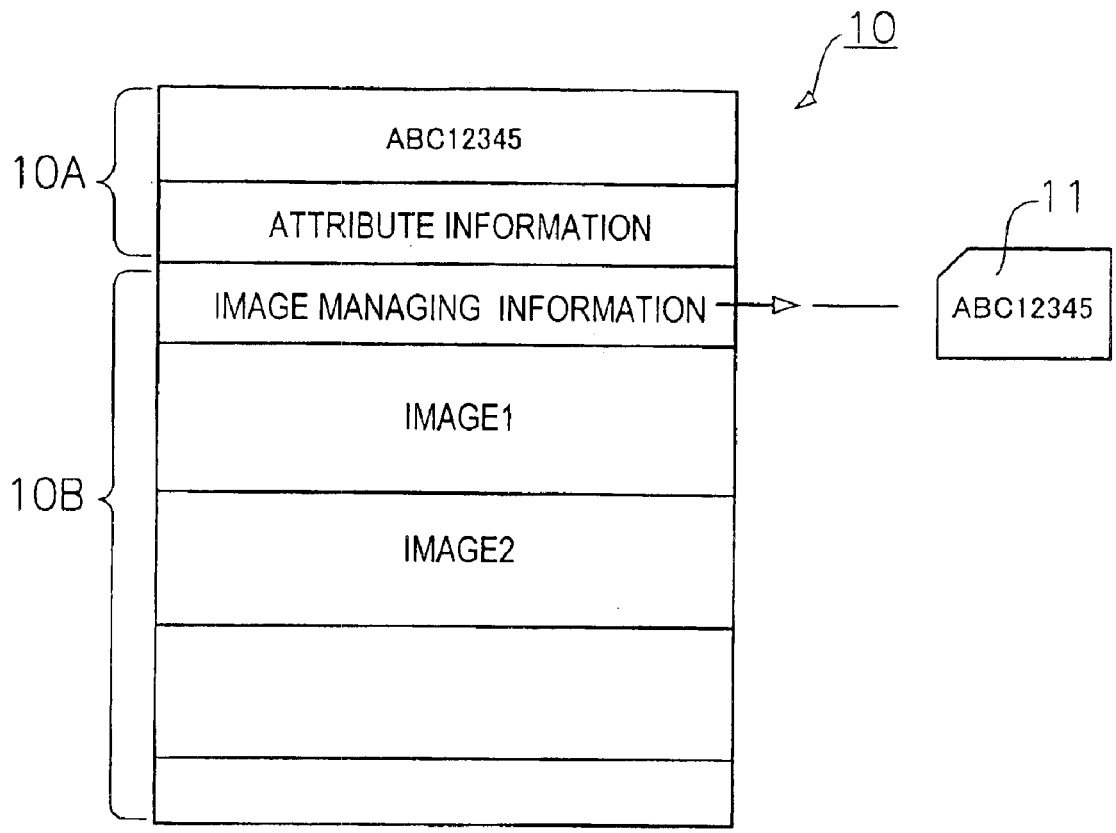
F I G. 2
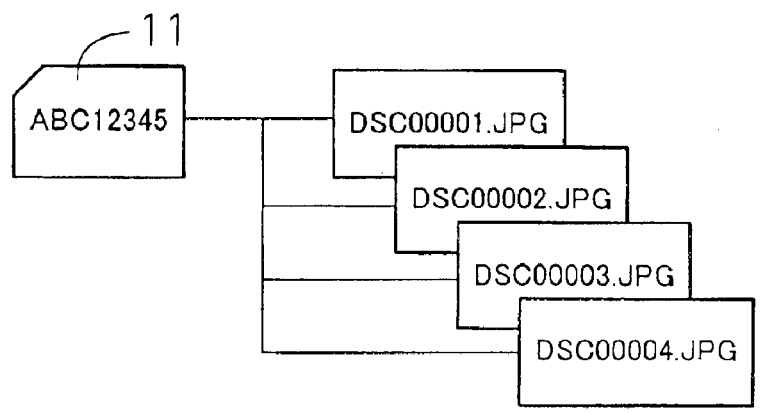

F I G. 3
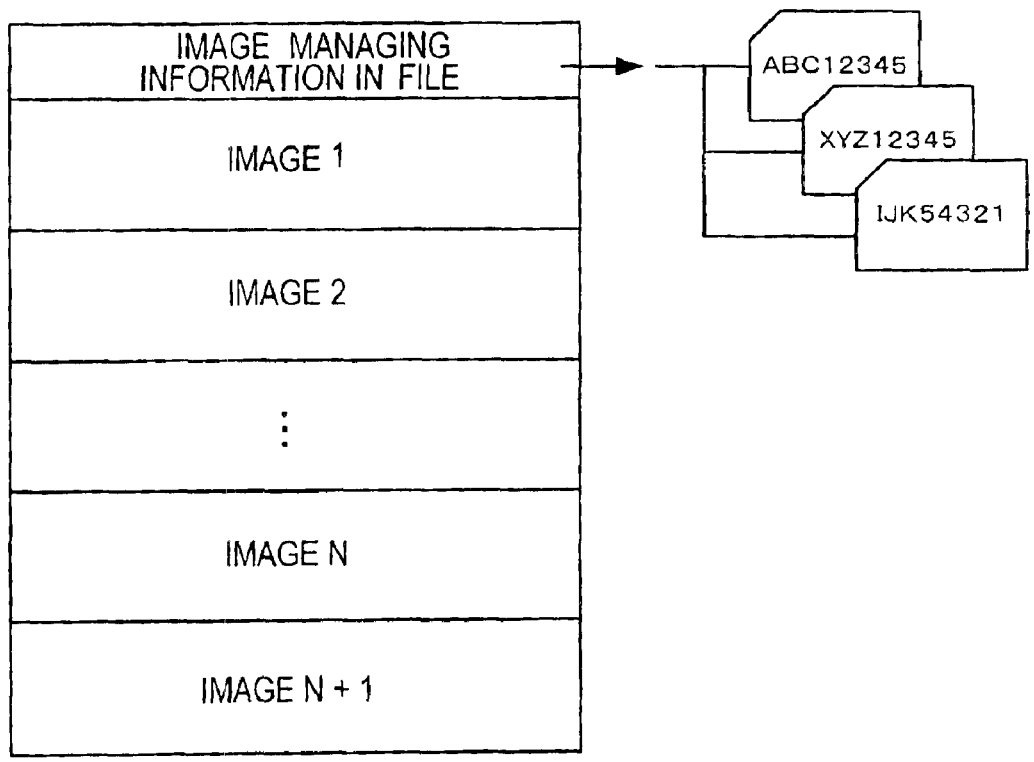

F I G. 7
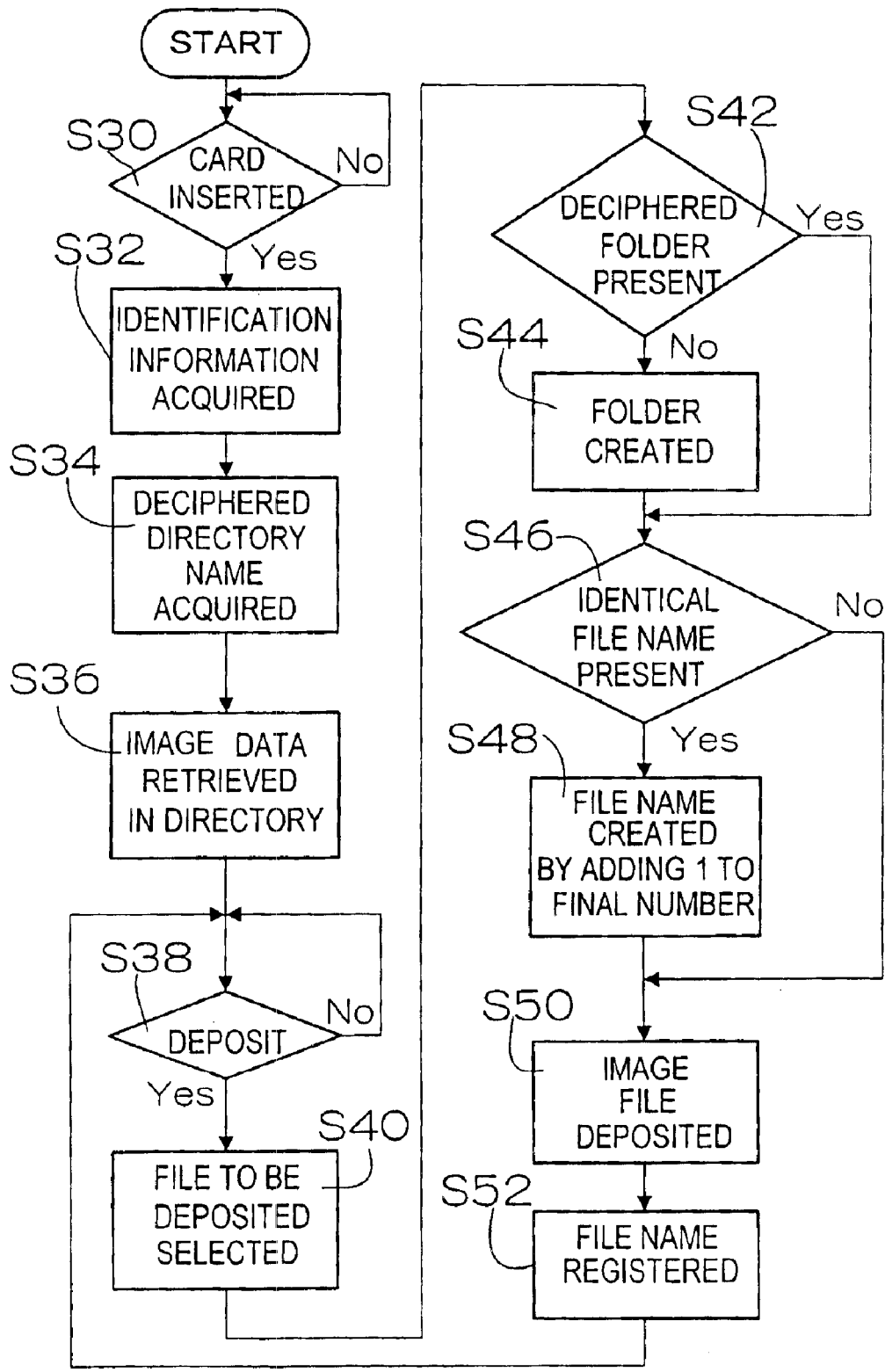

IMAGE FILE MANAGING METHOD, ELECTRONIC CAMERA AND IMAGE FILING APPARATUS

BACKGROUND OF THE INVENTION

1. Field of the Invention

The present invention relates to an image file managing method, an electronic camera and an image filing apparatus, and more specifically a technology for depositing an image file in a predetermined image folder.

2. Description of Related Art

There is conventionally known an image input system which is configured to read an image with a scanner used by a plurality of users, to transmit this image to a deposit destination directory corresponding to identification information (user ID) and to deposit the image in the directory (Japanese Patent Laid-Open No. 10-190993).

The scanner of this image input system is configured to receive the user ID from a radio card possessed by a user, thereby being capable of easily reading the user ID without using any method which inputs a user ID from an operation panel of a scanner each time an image or the like is read and transmitted or a method which reads a user ID with a card reader of a scanner.

However, the above described conventional image input system requires tedious procedures since this image input system obliges a scanner manager to preliminarily store user data such as a deposit destination directory for each user ID in a directory management table by setting the user data with keys or the like on an operation panel.

Furthermore, information corresponding to the user ID is not discriminated and not suited for management of images since images read by a scanner are transmitted and deposited to and in the deposit destination directory corresponding to the user ID on the basis of the user ID which is transmitted from the radio card. Concretely speaking, the images read by the scanner include not only photographic images but also original images such as typescript documents prepared with word processors and these images (including data converted into image codes) are deposited in a deposit destination directory, thereby being not suited for management.

SUMMARY OF THE INVENTION

The present invention which has been achieved in view of such circumstances has an object to provide an image file managing method, an electronic camera and an image filing apparatus which are capable of automatically preparing an image folder for depositing an image file for each recording medium and managing images for each recording medium.

In order to attain the above described object, the present invention is directed to an image file managing method, comprising the steps of: using a recording medium which has unique identification information recorded in a rewrite impossible area; discriminating between presence and absence of an image folder having an image folder name corresponding to the identification information at the time of depositing an image file recorded on the recording medium in an image filing apparatus; depositing the image file in the image folder when the image folder is present; and creating an image folder having the image folder name corresponding to the identification information when the image folder is not present and depositing the image file in the created image folder.

According to the present invention, the image folder having the image folder name corresponding to the unique identification information recorded in the rewrite impossible area of the recording medium is automatically prepared and the image file recorded on the recording medium is deposited in the image folder prepared exclusively for the recording medium when an image folder having the image folder name corresponding to the identification information is absent. Accordingly, image files read from an identical recording medium are deposited in an identical image folder, thereby making it possible to manage images for each recording medium and making it unnecessary to designate deposit destinations for image files.

Preferably, the image filing managing method is characterized in that an image file name is created by adding 1 to an image file name which has a largest number out of deposited image files and an image file is deposited with this created image file name when an identical image file name is present in an image folder at the time of depositing an image file which has an image file name including a digit is present in the image folder. Accordingly, this image name filing method is capable of preventing an image file name from being duplicated, thereby preventing an image from being accidentally lost.

Preferably, the image filing managing method is characterized in that the identification information on the recording medium is read so that access can be made only to image files in an image folder which has an image folder name corresponding to the identification information. Furthermore, the above described folder name is characterized in that it is created by enciphering the above described identification information. In other words, this image managing method allows only a person who owns the recording medium to make access to an image file which is deposited in the image folder corresponding to the above described recording medium by way of the above described recording medium, thereby making it possible to enhance security of the deposited image file.

In order to attain the above described object, the present invention is directed to an electronic camera which records image data on a recording medium by using the recording medium which has unique identification information recorded in a rewrite impossible area, the camera comprising: an identification information acquiring device which acquires the identification information from the recording medium; a retrieving device which retrieves an image folder which has an image folder name corresponding to the acquired identification information; an image folder creating device which creates an image folder having an image folder name corresponding to the identification information when an image folder having the image folder name corresponding to the identification information is not present or when the recording medium is initialized; and a depositing device which deposits image data acquired at a photographing time as an image file together with an image file name in the image folder.

In order to attain the above described object, the present invention is directed to an image filing apparatus which deposits an image file recorded on a recording medium which has unique identification information recorded in a rewrite impossible area, the image filing apparatus comprising: an identification information acquiring device which acquires the identification information from the recording medium; a retrieving device which retrieves an image folder having an image folder name corresponding to the acquired identification information; an image folder creating device which creates an image folder having the image folder name corresponding to the identification information when the image folder having the image folder name corresponding to the identification information is not present; and a depositing device which deposits an image file recorded on the recording medium in the image folder corresponding to the recording medium.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a diagram showing a memory arrangement on a memory card used as a recording medium in the present invention;

FIG. 2 is a diagram showing an image file arrangement in an image folder;

FIG. 3 is a diagram showing a file arrangement in an image filing apparatus;

FIG. 7 is a flow chart showing an operating sequence for accommodating an image file recorded on a memory card on a magnetic disk.

DETAILED DESCRIPTION OF THE PREFERRED EMBODIMENT

Figure 4:
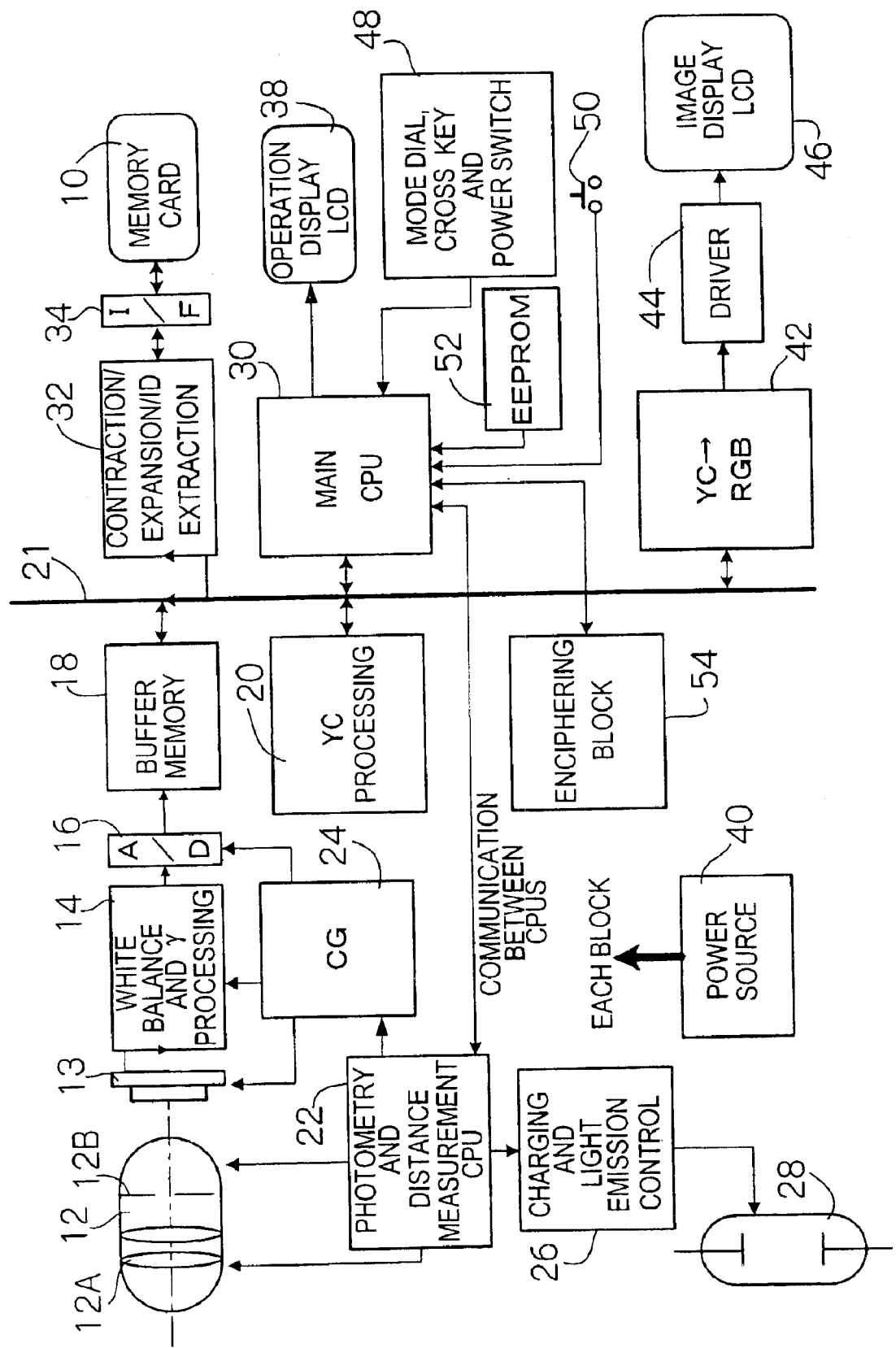
FIG. 4 is a block diagram showing a configuration of an electronic camera according to the present invention.

Description will be made in detail of preferable embodiments of the image file managing method, the electronic camera and the image filing apparatus according to the present invention.

First, the image file managing method according to the present invention will be outlined.

FIG. 1 shows a memory arrangement on a memory card 10 which is to be used as a recording medium in the present invention. As shown in FIG. 1, arranged on this memory card are a rewrite impossible area 10A and a rewrite possible area 10B, and unique identification information (ABC12345) in FIG. 1) and attribute information such as a memory capacity, a speed or the like are to be recorded in the rewrite impossible area 10A, whereas image managing information and image data managed with the image managing information are to be recorded in the rewrite possible area 10B.

When the above described memory card 10 is initialized in the electronic camera according to the present invention, a directory (image folder) 11 having a name of the above described identification information is automatically created on the basis of the identification information recorded in the above described rewrite impossible area 10A and recorded as the image managing information. In an embodiment shown in FIG. 1, the identification information is the name of the image folder.

Image data in each frame which is obtained with an electronic camera at a photographing time is recorded in an image folder with image file names of "DSC00001.JPC through DSC99999.JPC" as shown in FIG. 2.

Then, description will be made of a case where image files recorded on the above described memory card are managed with an image filing apparatus according to the present invention.

FIG. 3 shows a file arrangement on a memory medium having a large capacity such as a hard disk of the image filing apparatus. When the memory card is charged, the image filing apparatus reads identification information unique to the memory card and records image files of the charged memory card in an image folder when an image folder having a name of the identification information is present in image managing information in the files as shown in FIG. 3.

When the image folder having the name of the identification information unique to the memory card is not present in the image managing information in the files, the image filing apparatus automatically creates an image folder having the name of the identification information on the basis of the identification information read from the memory card and records the image files of the memory card in the image folder newly created.

That is, the image folder having the name of the identification information is automatically created and the image files recorded on the memory card 10 are deposited in the image folder created exclusively for the memory card when an image folder having the name of the image folder corresponding to the unique identification information recorded in the rewrite impossible area 10A of the memory card 10 is not present. Accordingly, image files read from an identical memory card are deposited in an identical image folder, thereby making it possible to manage images for each memory card and making it unnecessary to designate deposit destinations for image files.

FIG. 4 is a block diagram showing a configuration of an electronic camera according to the present invention.

In FIG. 4, applied to a main CPU 30 are switch inputs from operation switches 48 including a mode dial which selects a photography mode, a reproduction mode, etc., a multi-function cross key and a power switch as well as a release switch 50 so that the main CPU 30 carries out processing corresponding to the inputs from the operation switches 48 and the release switch 50. Furthermore, the main CPU 30 exchanges required data between an electrical erasure possible programmable ROM (EEPROM) 52 and an enciphering block 54. Accommodated in the EEPROM 52 are various kinds of parameters and data related to camera control. Upon receiving the identification information from the main CPU 30, the enciphering block 54 enciphers this information and returns it to the main CPU 30.

When a photography mode is selected and the release switch 50 is depressed, the main CPU 30 detects the switch inputs and sends a command to a camera CPU 22 by communication between the CPUs. Upon inputting the above described command, the camera CPU 22 performs a focus control and an exposure control on the basis of a measured photometric value and a measured distance value, thereby focusing imaging rays from an object to be photographed onto a light receiving surface of a solid-state image pickup device (CCD) 13 by way of an optical unit 12 which has a photographic lens 12A, a stop 12B or the like.

The CCD 13 converts the imaging rays focused on the light receiving surface into signal electric charges in an amount corresponding to an amount of the imaging rays. The signal electric charges which are thus accumulated are read out consecutively as voltage signals (image signals) corresponding to the signal electric charges on the basis of clock pulses provided from a clock generating circuit 24. An image signal which is output from the CCD 13 is applied to an analog processing circuit 14 which performs white balance adjustment and gamma correction. The image signal which is processed by the analog processing circuit 14 is converted into digital data by an A/D converter 16 and deposited once in a buffer memory 18.

The camera CPU 22 operates a strobe control circuit 26 when the object to be photographed is dark. The strobe control circuit 26 controls a charged control of a main capacitor (not shown) and electric discharge (light emission) from a xenon lamp 28 in synchronization with an operation of the release switch when the object to be photographed is dark. Furthermore, the strobe control circuit 26 controls an electric charge accumulating time of the CCD 13 (a shutter speed) by way of the clock generating circuit 24. The clock generating circuit 24 outputs clock pulses for driving the CCD 13, the analog processing circuit 14 and the A/D converter 16, thereby synchronizing these circuits.

A YC processing circuit 20 converts image data in the buffer memory 18 into YC signals (a luminance signal Y and a chroma signal C) with a command which is applied from the main CPU 30 by way of a bus 21 and deposits the YC signals again into the buffer memory 18. Then, the main CPU 30 sends a command to a compression/expansion circuit 32, whereby the compression/expansion circuit 32 compresses the YC signals on the buffer memory 18 and records compressed image data on the memory card 10 by way of a card interface 34.

Furthermore, the YC signals deposited in the buffer memory 18 are converted into RGB data by a YC/RGB converter 42 and applied to a liquid crystal monitor 46 by way of a driver 44. Accordingly, the liquid crystal monitor 46 displays a moving image or a still image in the photography mode or an image recorded on the memory card 10 in the reproduction mode. In FIG. 4, reference numeral 38 denotes a liquid crystal panel for displaying various kinds of items such as a frame number and reference numeral 40 denotes a battery which supplies power to each block in the electronic camera.

Figure 5:
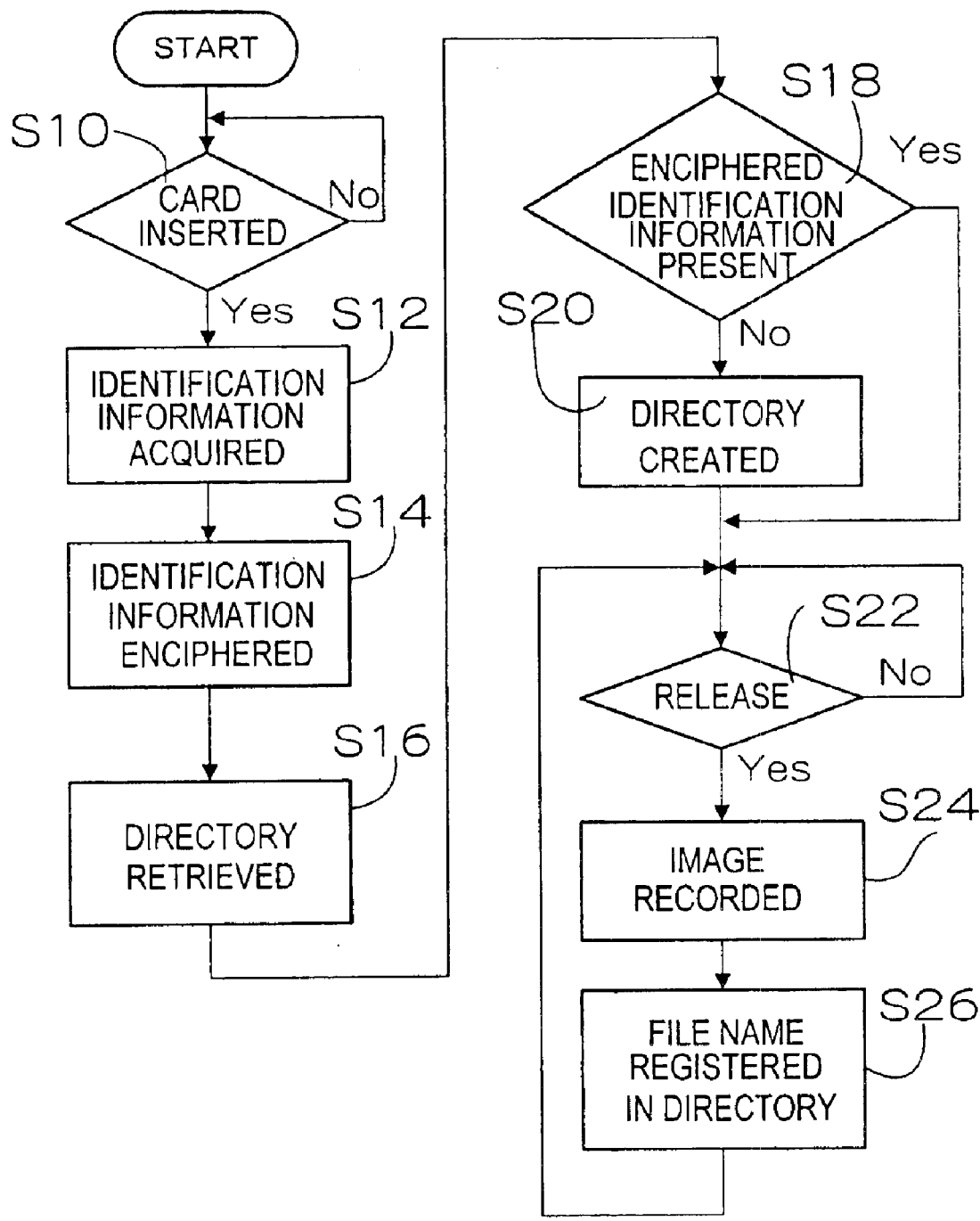
FIG. 5 is a flow chart showing image recording operations of the electronic camera according to the present invention.

Next, description will be made of image recording operations of the electronic camera having the above-described configuration with reference to a flow chart shown in FIG. 5.

First, the main CPU 30 discriminates whether or not the memory card 10 is inserted in a card slot of the electronic camera (step S10) and when the memory card 10 is inserted, the main CPU 30 reads the unique identification information from the rewrite impossible area 10A (see FIG. 1) of the above described memory card 10 (step S12). Successively, the main CPU 30 enciphers the read identification information with an enciphering block 54 (step S14) and retrieves a directory which has a name of the enciphered identification information (step S16). The main CPU 30 proceeds to step S22 when a directory which has the name of the enciphered identification information is present in image managing information on the memory card 10, or creates a directory having the name of the enciphered identification information (step S20) and proceeds to step S22 when a directory which has the name of the enciphered identification information is not present.

When the release switch 50 is turned ON at step S22, image data in photographed frames is recorded on the memory card 10 (step S24), an image file name (a newest number out of "DSC00011.JPC through DSC99999.JPC" is added to the image data and the image data is registered in the directory which has the name of the above described enciphered identification information (step S26).

In addition, a directory which has the name of the enciphered identification information of the memory card 10 is automatically created also in a case where the memory card 10 is initialized with the electronic camera.

Figure 6:
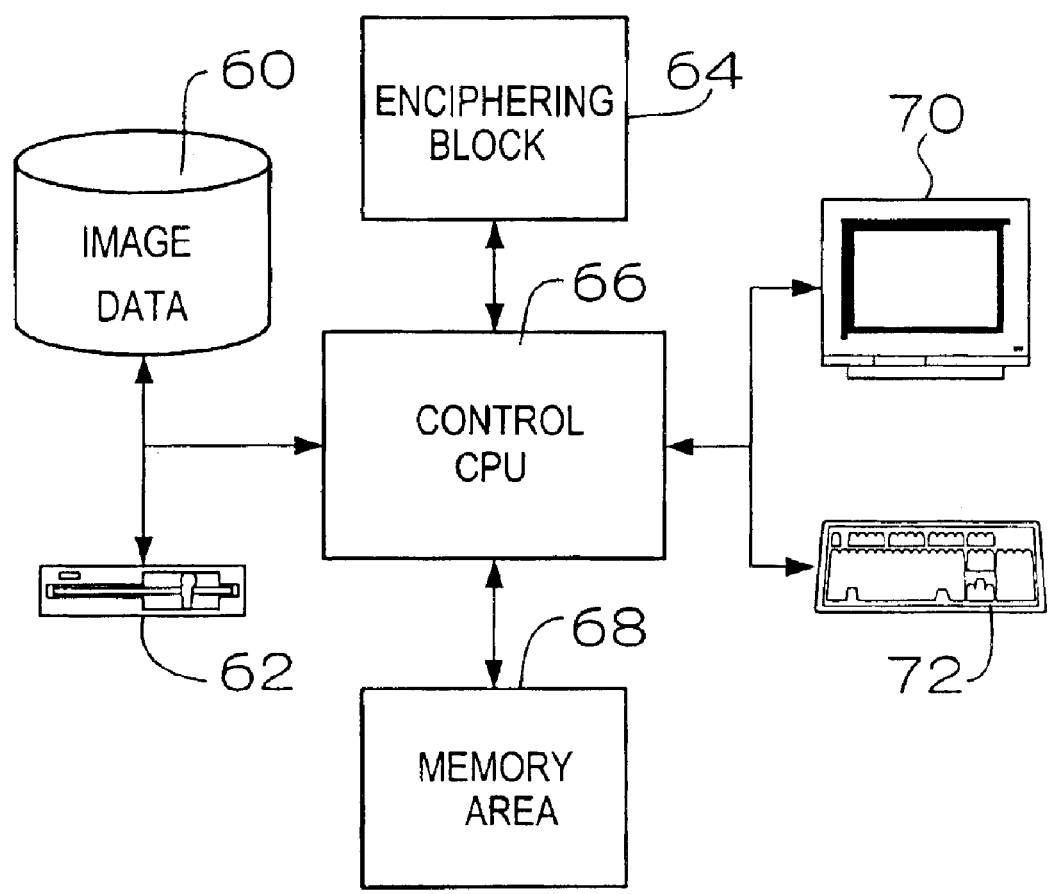
FIG. 6 is a block diagram showing a configuration of an image filing apparatus according to the present invention.

FIG. 6 is a block diagram showing an image filing apparatus according to the present invention.

The image filing apparatus mainly comprises a magnetic disk 60, a card reader/writer 62, an enciphering block 64, a control CPU 66, a main memory 68, a monitor 70 and a keyboard 72 as shown in FIG. 6.

The magnetic memory 60 accommodates various kinds of programs for operating the image filing apparatus and has a memory capacity sufficient for accommodating a large number of image files. Furthermore, the main memory 68 accommodates required software and the control CPU 66 processes the files with the software of the main memory 68 on the basis of input operations from the keyboard 72 or a mouse (not shown). The enciphering block 64 performs enciphering processing which is the same as that of the enciphering block 54 of the electronic camera.

Next, description will be made of operations of the above-described image filing apparatus with reference to flow charts shown in FIGS. 7 and 8.

FIG. 7 is a flow chart showing operating sequence for accommodating the image files recorded on the memory card 10 on the magnetic disk 60.

As shown in FIG. 7, the control CPU 66 judges whether or not the memory card 10 is inserted in the card slot of the card reader/writer 62 (step S30), and when the memory card 10 is inserted, the control CPU reads the unique identification information from the rewrite impossible area 10A of the above described memory card 10 (see FIG. 1) (step S32). Successively, the control CPU 66 enciphers the read identification information with the enciphering block 64 and acquires enciphered identification information (that is, a deciphered directory name) (step S34).

Then, the control CPU 66 retrieves image data in the above-described directory (step S36). The control CPU 66 judges whether or not the retrieved image data is to be deposited (step 38) and selects image files to be deposited (step 40) when the image data is to be deposited. The image files to be deposited are selected using the keyboard 72 or the like while referring to a display screen of the monitor 70. The control CPU 66 discriminates whether or not an image folder having the deciphered directory name (image folder name) is present (step S42). The control CPU 66 proceeds to step S46 when an image folder having the above described folder name is present or creates an image folder which has the above described image folder name at step S44 and then proceeds to step S46 when an image folder having the above described image folder name is not present.

At step S46, the control CPU 66 judges whether or not an image file which has an image file name identical to that of the image file to be deposited in the image folder is present in the image folder, actually deposits the image file to be deposited into the above described image folder (step S50) and registers the image file name of the image file to be deposited (step S52) when an image file having the identical name is not present.

When an image file having the identical image file name is present, on the other hand, the control CPU 66 creates a new image file name by adding 1 to an image file name which has a final number in the image folder (step S48), then actually deposits the image file to be deposited into the image folder (step S50) and registers the above described created image file name (step S52).

Figure 8:
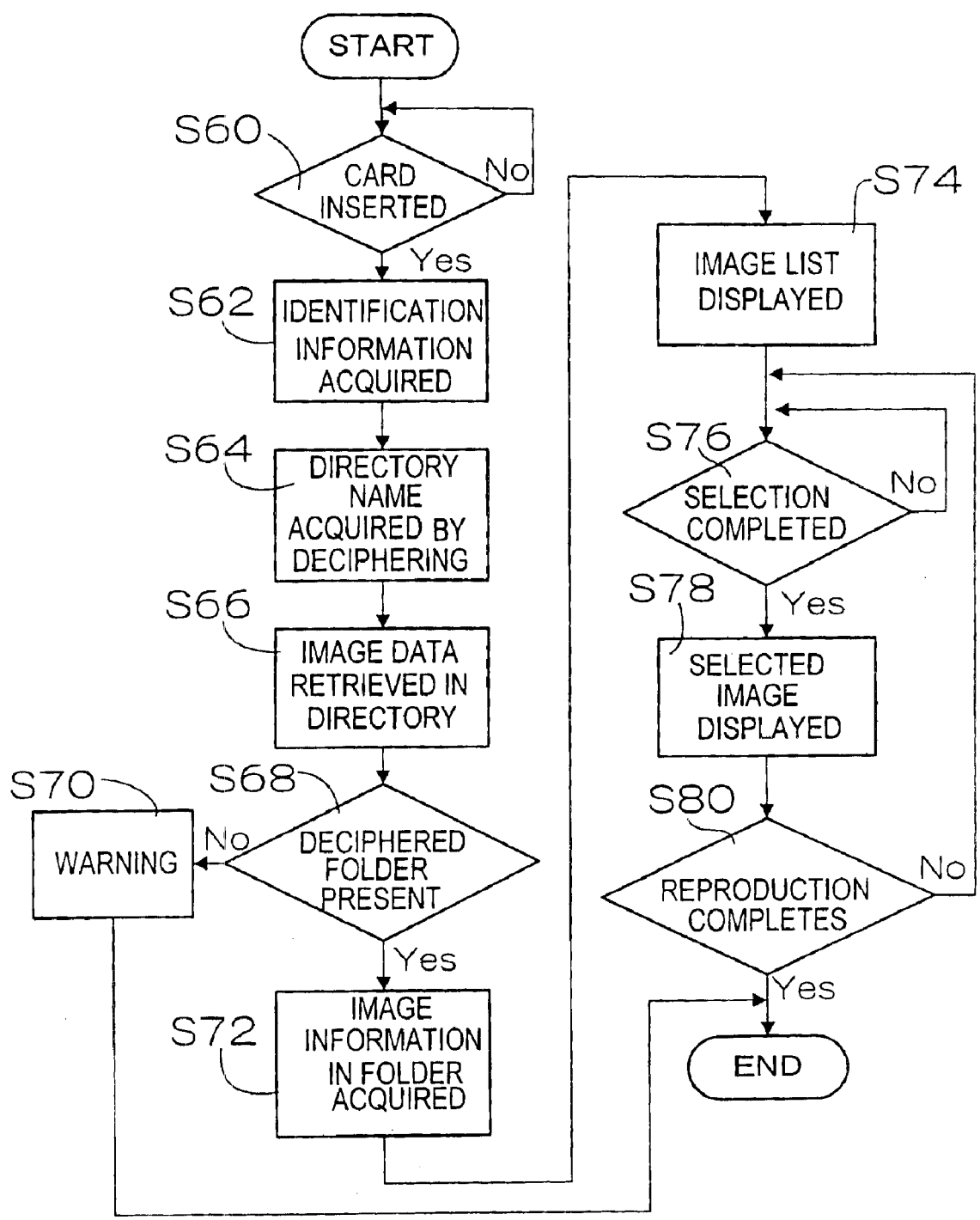
FIG. 8 is a flow chart showing an operating sequence for reproducing an image of an image file deposited on a magnetic disk.

FIG. 8 is a flow chart showing operating sequence for reproducing an image on the image file which is deposited as described above.

The control CPU 66 judges whether or not the memory card 10 is inserted in the card slot of the card reader/writer 62 (step S60) and reads the unique identification information from the rewrite impossible area 10A of the above described memory card 10 (step S62) as shown in FIG. 8 when the memory card 10 is inserted. Successively, the control CPU 66 deciphers the read identification information and acquires a deciphered directory name (step S64).

Then, the control CPU 66 retrieves image data in the above-described directory (step S66). The control CPU 66 discriminates whether or not an image folder having the deciphered directory name (image folder name) is present (step S68), emits a warning (step S70) and terminates the operating sequence when an image folder having the above described folder name is not present.

When an image folder having the above described folder name is present, on the other hand, the control CPU 66 acquires image information such as thumbnail image information in the image folder and allows the monitor 70 to display an image list on the basis of the image information (step S74). When a desired image to be reproduced is selected using the keyboard 72 or the like while referring to the list of images (step S76), the control CPU 66 reads out main image data of the selected image and allows the monitor 70 to display the selected image on the basis of the main image data (step S78).

Successively, the control CPU 66 discriminates whether or not reproduction end is designated (step S80) and returns to step S76 to allow another image to be selected when the reproduction end is not designated. When the reproduction end is designated, on the other hand, the image filing apparatus terminates the reproduction of images.

The image filing apparatus according to the present invention is configured so as not to allow access to be made for reproducing images in an image file deposited as described above without using any memory card which is used for depositing an image file (that is, a memory card having identification information corresponding to a name of an image folder), thereby enhancing security of the image when the image filing apparatus is used by a plurality of persons. Even when access can be made to the images in the image folder without using any memory card, the image filing apparatus does not allow a corresponding image folder to be found from the identification information of the memory card since the image folder name is enciphered, thereby enhancing security of the images.

The image filing apparatus according to the present invention is configured to automatically create an image folder having an image folder name corresponding to unique identification information on the basis of the above described identification information recorded in a rewrite impossible area of a recording medium as described above so that image files recorded on the recording medium are deposited in an image folder created exclusively for the recording medium, thereby providing merits to make it possible to manage images for each recording medium and make it unnecessary to designate a deposit destination for image files.

Furthermore, the image filing apparatus according to the present invention is configured to allow only a person who owns a predetermined recording medium to make access to image files which are deposited in an image folder by way of the predetermined recording medium, thereby being capable of enhancing security of the deposited image files.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image file managing method, comprising the steps of: using a recording medium which has unique identification information recorded in a rewrite impossible area; discriminating between presence and absence of an image folder having an image folder name corresponding to the identification information at the time of depositing an image file recorded on the recording medium in an image filing apparatus; depositing the image file in the image folder when the image folder is present; and creating an image folder having the image folder name corresponding to the identification information when the image folder is not present and depositing the image file in the created image folder.

2. The image filing managing method according to claim 1, wherein another image file name is created by adding 1 to an image file name which has a largest number out of deposited image files and an image file is deposited with the another image file name when an identical image file name is present in an image folder at the time of depositing an image file which has an image file name including a digit is present in the image folder.

3. The image file managing method according to claim 1, wherein the identification information on the recording medium is read so that access can be made only to image files in an image folder which has an image folder name corresponding to the identification information.

4. The image file managing method according to claim 1, wherein the image folder name is created by enciphering the identification information.

5. An electronic camera which records image data on a recording medium by using the recording medium which has unique identification information recorded in a rewrite impossible area, the camera comprising: an identification information acquiring device which acquires the identification information from the recording medium; a retrieving device which retrieves an image folder which has an image folder name corresponding to the acquired identification information; an image folder creating device which creates an image folder having an image folder name corresponding to the identification information when an image folder having the image folder name corresponding to the identification information is not present or when the recording medium is initialized; and a depositing device which deposits its image data acquired at a photographing time as an image file together with an image file name in the image folder.

6. An image filing apparatus which deposits an image file recorded on a recording medium which has unique identification information recorded in a rewrite impossible area, the image filing apparatus comprising: an identification information acquiring device which acquires the identification information from the recording medium; a retrieving device which retrieves an image folder having an image folder name corresponding to the acquired identification information; an image folder creating device which creates an image folder having the image folder name corresponding to the identification information when the image folder having the image folder name corresponding to the identification information is not present; and a depositing device which deposits an image file recorded on the recording medium in the image folder corresponding to the recording medium.

* * * * *